United States Patent
Schmidt

(10) Patent No.: US 8,510,987 B2
(45) Date of Patent: Aug. 20, 2013

(54) PLASTIC PLANT POT

(75) Inventor: Guido Schmidt, Dinklage (DE)

(73) Assignee: Poppelmann Holding GmbH & Co. KG, Lohne (DE)

( * ) Notice: Subject to any disclaimer, the term of this patent is extended or adjusted under 35 U.S.C. 154(b) by 0 days.

(21) Appl. No.: 12/673,873

(22) PCT Filed: Sep. 19, 2008

(86) PCT No.: PCT/EP2008/007863
§ 371 (c)(1),
(2), (4) Date: Feb. 17, 2010

(87) PCT Pub. No.: WO2009/046838
PCT Pub. Date: Apr. 16, 2009

(65) Prior Publication Data
US 2011/0036003 A1    Feb. 17, 2011

(30) Foreign Application Priority Data

Oct. 8, 2007  (DE) ............... 20 2007 014 037 U

(51) Int. Cl.
*A01G 9/02*    (2006.01)
(52) U.S. Cl.
USPC ........................................... 47/65.5
(58) Field of Classification Search
USPC ............... 47/65, 65.5, 66.1, 66.6, 71, 73
IPC ................... A01G 31/02, 09/02, 23/02
See application file for complete search history.

(56) References Cited

U.S. PATENT DOCUMENTS

| 296,028 | A | * | 4/1884 | Martin ............................... 47/71 |
| 2,550,989 | A | * | 5/1951 | Newton et al. ................ 248/506 |
| 2,770,957 | A | * | 11/1956 | Bronson .................... 220/23.83 |
| 4,057,931 | A | * | 11/1977 | Stutelberg et al. ................ 47/83 |
| 5,269,095 | A | * | 12/1993 | Helfman et al. ............... 47/65.5 |
| 5,761,848 | A | * | 6/1998 | Manlove ........................ 47/65.5 |
| 7,278,238 | B2 | * | 10/2007 | Maniscalco et al. ........... 47/65.6 |
| 7,624,535 | B2 | * | 12/2009 | Schmidt ........................ 47/65.5 |
| 2002/0174599 | A1 | | 11/2002 | Rose |
| 2004/0211118 | A1 | * | 10/2004 | Smith et al. .................... 47/66.5 |
| 2005/0091920 | A1 | * | 5/2005 | Smead .............................. 47/71 |
| 2008/0264957 | A1 | | 10/2008 | Schmidt |
| 2008/0276530 | A1 | * | 11/2008 | Trabka ............................ 47/86 |

FOREIGN PATENT DOCUMENTS

| DE | 20 2005 012 314 U1 | 3/2006 |
| JP | 02001299098 | * 10/2001 |
| NL | 1 020 443 C2 | 10/2003 |

* cited by examiner

*Primary Examiner* — Son T Nguyen
*Assistant Examiner* — Thien Thanh Pham
(74) *Attorney, Agent, or Firm* — Robert C. Haldiman; H. Frederick Rusche; Husch Blackwell LLP

(57) ABSTRACT

A plant pot made of plastic with a predominantly vertically aligned wall and a predominantly horizontally aligned bottom connected on the edge with the wall, which is arched upwards at least in an inner part in the form of a cupola, is configured to secure the bottom area against being compressed through and dented through the material that is as thin-walled as possible, in such a way that the cupola is reinforced by profile braces that run as interties from a central area of the cupola to at least the peripheral areas of the cupola.

21 Claims, 8 Drawing Sheets

PLASTIC PLANT POT

FIELD OF THE INVENTION

The invention relates to a plastic pot.

BACKGROUND OF THE INVENTION

Plant pots of this type for commercial gardening are generally equipped with a bottom that contains openings for effective water drainage and also when water is supplied temporarily in excess, and on their undersides, with an interval from a placement surface for drainage of water and for ventilation. Surge-watering by means of spraying from above or so-called "ebb-and-flow watering," in which the plant pots are flushed from time to time from below, first makes provision for water impingement that goes beyond a moisturizing requirement, that reduces drainage of excess water. To avoid waterlogging, especially a water drain on the bottom is to be provided if the plant pot stands on a placement surface that is wetted by water or even provided with water holes. Typically this is to be considered if the plant pots are placed on concrete floors, which form puddles on uneven ground when subjected to excess watering.

Since to save money and materials, plant pots in commercial gardening are designed with thin walls, and since the bottoms of such plant pots can sag downward due to filling, planting or root pressure, at least an inner section of the bottom of such plant pots are arched in cupola fashion. Outer sections of the bottom are stabilized by the adjoining wall, and also mostly made higher by protuberances like edge flanges or knubs. The upward archings are to be kept relatively flat, in order not to yield much pot space and not to create somewhat rugged edge areas in the pot. It is true that the result of this is that when the pot is vigorously filled with substrate and similar material, and also especially when tendril sticks and the like are inserted, the pot can be pressed or dented through in unwanted fashion. Thus, the plant pot no longer is capable of drainage and lacks strength.

BRIEF SUMMARY OF THE INVENTION

Accordingly, the task of the invention is to create a plant pot with a bottom that has a customary thin-walled design and can be manufactured by ordinary mass production, but has a bottom area in the form of an arched cupola that is secure against being compressed and dented through.

According to the invention this problem is solved by a plant pot with the profile brace, the cupola form can be substantially reinforced and secured against being dented through downwards. Any compression forces on the cupola and the remainder of the floor that appear when plan substrate is put in, when plants are put in or also —more selectively —when tendril sticks and supporting sticks are inserted for the plants, are accommodated only to a small extent by denting and bending forces within the cupola shell, in essence as tension forces (longitudinal forces) by the profile braces. These direct the corresponding forces as longitudinal forces to the circumferential areas, which are reinforced at the factory through the walls of the plant pot.

In appropriate fashion, the cupola can be designed to be point-symmetrical relative to the central area, so that the profile braces run radially or in any case in point-symmetric fashion. The central area can be designed as a depression to the level of the profile braces, to connect the profile braces centrally with each other at a level, and also in connection with a hole with multiple holes, to produce a water drain.

Adapting to production techniques for plant pots, the profile braces can be configured as hollow profiles open on the top side, which are shaped between sectors of the cupola. Then a continuous shell form results with profile braces shaped in as hollow profiles. Such an embodiment form can be used in mass production both with injection molded and deep-drawn plant pots.

With injection-molded plant pots, profile braces can also be applied as ribs beneath continuous wall areas of the cupola.

BRIEF DESCRIPTION OF THE DRAWINGS

Two embodiment examples of the invention are depicted in the drawings and are described in what follows with greater detail. Shown in the drawing are.

DETAILED DESCRIPTION OF THE INVENTION

Figure 1:
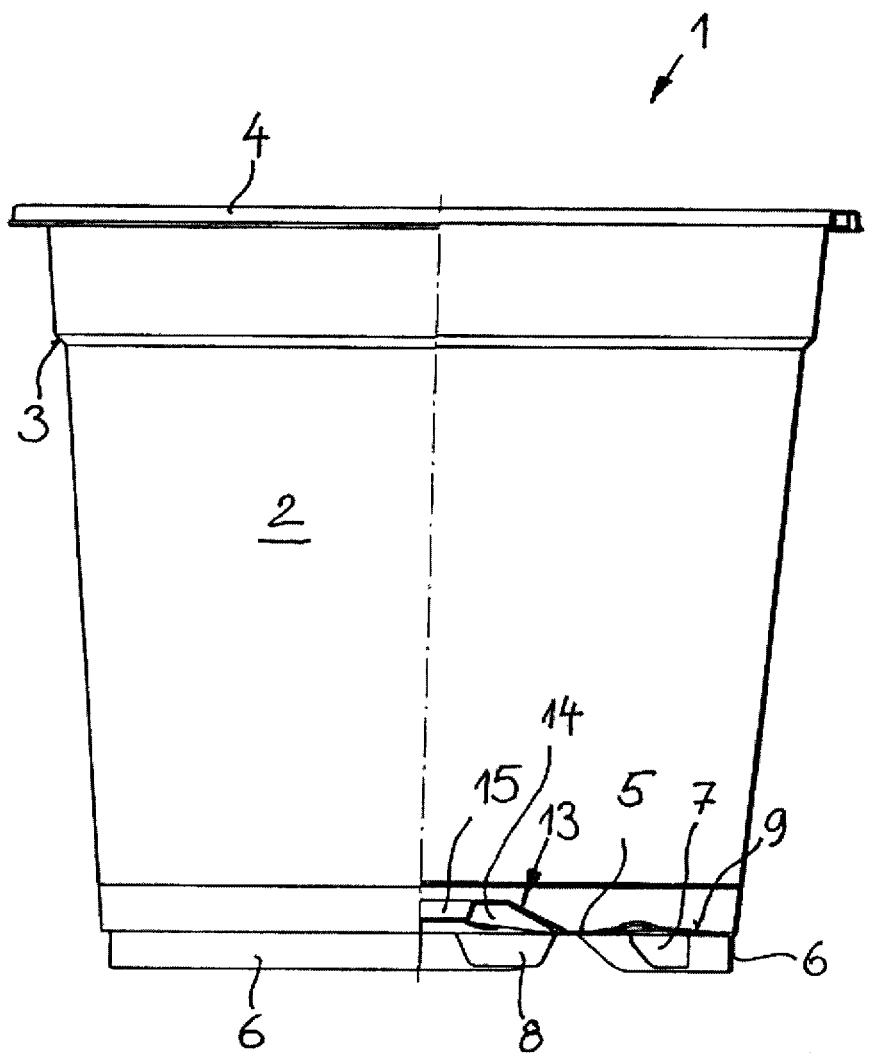
FIG. 1: Side view of a plant pot, half of it as a cut-away section
Figure 2:
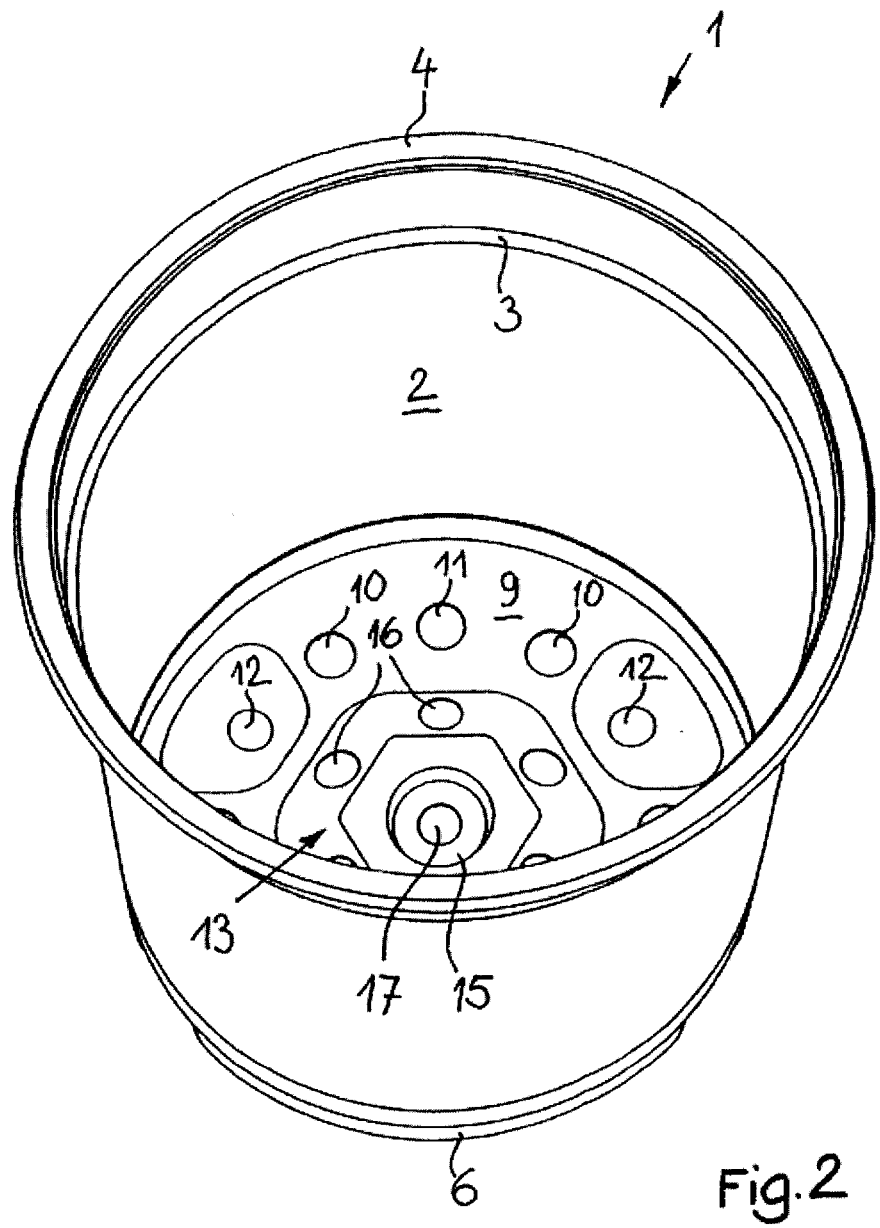
FIG. 2: Slanted view of the plant pot from above
Figure 3:
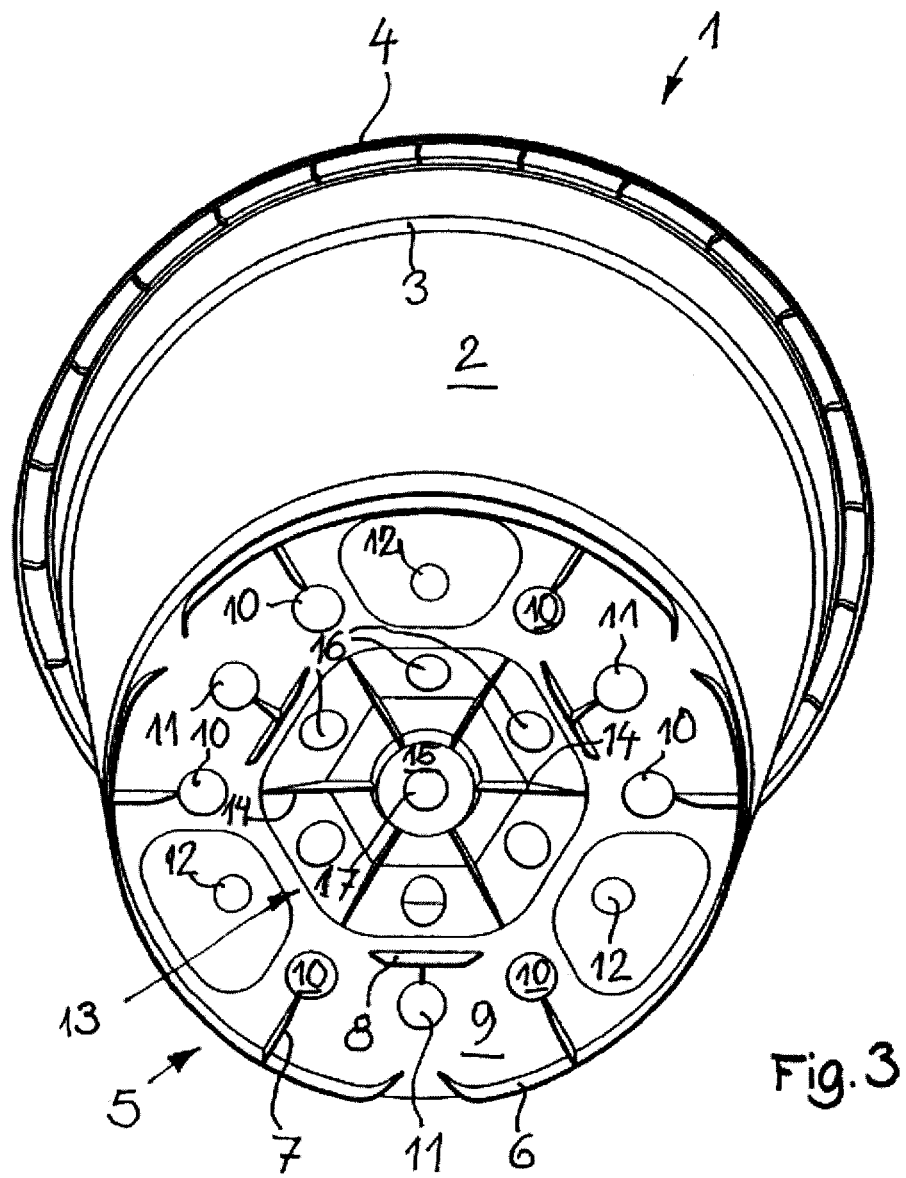
FIG. 3 Slanted view of the plant pot from below
Figure 4:
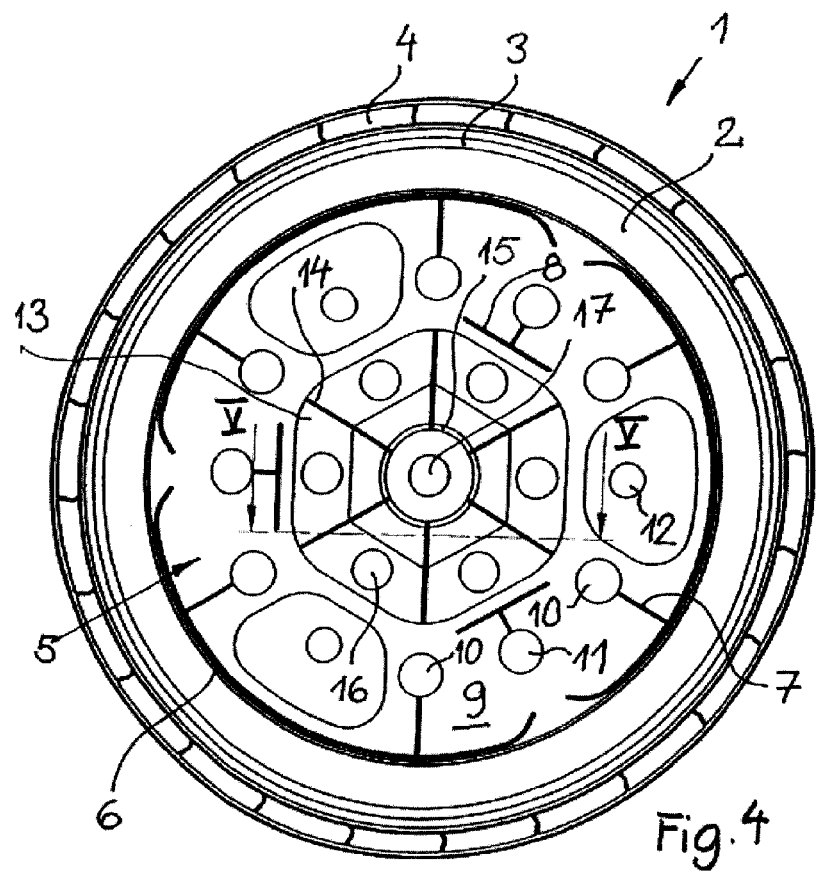
FIG. 4 Bottom view of the plant pot
Figure 5:
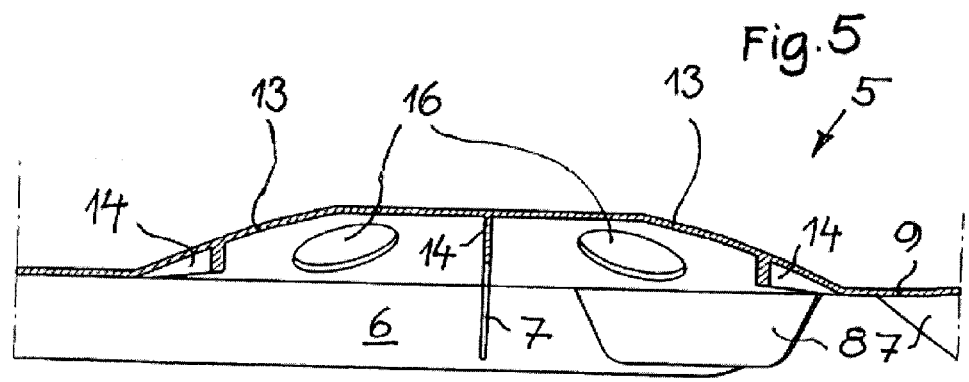
FIG. 5 Section according to V-V in FIG. 4 enlarged at a 2:1 scale

A plant pot designated overall by 1 in FIGS. 1 to 4 has a customary form in essence shaped like a truncated cone with a wall that is extended upward and is reinforced via a narrow ledge 3 and makes a transition into an edge projecting outwards. On the underside, a bottom 5 is extended via edge ribs 6. Further rib-like projections 7, that are connected at right angles with edge ribs 6, and brace them on the inner side, run predominantly radially beneath bottom 5. T-shaped rib projections are placed beneath a flat peripheral area 9 of bottom 5 as placement feet. As is visible from FIG. 1, the rib projections 8 are designed to be slightly shortened, by which a certain sagging of the bottom is allowed for after the pot is filled, and in any case pot 1 is ensured to sit upright on edge ribs 6. In the flat circumferential area 9, a circular pattern of holes is arranged for water drainage, with ribs 7 and 8 each brought up with slanted drainage edges to holes 10, 11 and 12, to ensure as complete a water drainage as possible and to avoid suspended drops. The holes 10, 11, 12 lie especially low with the peripheral area 9 and correspondingly are especially important for (complete) water removal.

In a central area of bottom 5, a flat cupola 13 is arched upwards, to reliably create an interval from a support surface for plant pot 1, when it sags owing to the pot being filled. It is true that a customary configuration with a flat cupola has proven to be unreliable, since major loadings by means of manual and machine-aided filling of the plant pot with subsequent compression, or also insertion of support rods or the like into the plant pot can result in the cupola being dented downwards.

According to the invention, this is effectively remedied in that the cupola 12 with plant pot 1 is reinforced in star fashion by profile braces 14, which run as interties from a central area toward the peripheral area 9. These profile braces 14 attach as upright ribs on the underside on the cupola 13 and extend horizontally or flat to the level of the peripheral area 9, descending to it. On the inner side they abut onto a depression 15 of cupola 13, which here does not run entirely down to the level of the peripheral area 9, but to the level of the lower edges of profile braces 14, and also connects them with each other. What is thus gained is that the cupola 13 can accommodate large loadings. The cupola 13 has water drainage holes 16 between the profile braces 14, which naturally also contribute to ventilation of the plant pot and of balled-up roots contained within it. Also, the depression 15 is provided with a water drainage hole 17.

Figure 6:
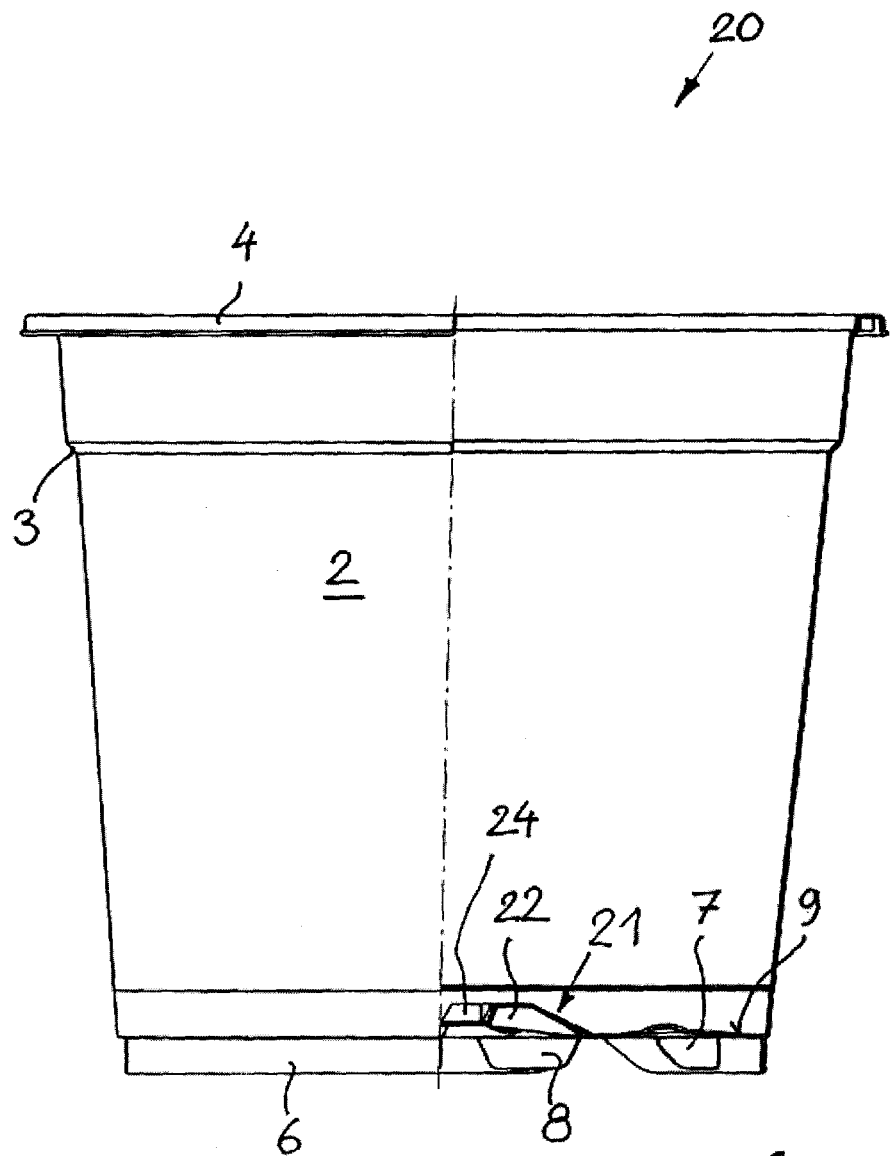
FIG. 6 Side view of a second embodiment form of a plant pot, half of it as a cut-away section FIG. 7 Slanted view of a plant pot as per FIG. 6 from above FIG. 8 Slanted view of a plant pot as per FIGS. 6 and 7 from below FIG. 9 Bottom view of the plant pot as per FIGS. 6 to 9
Figure 7:
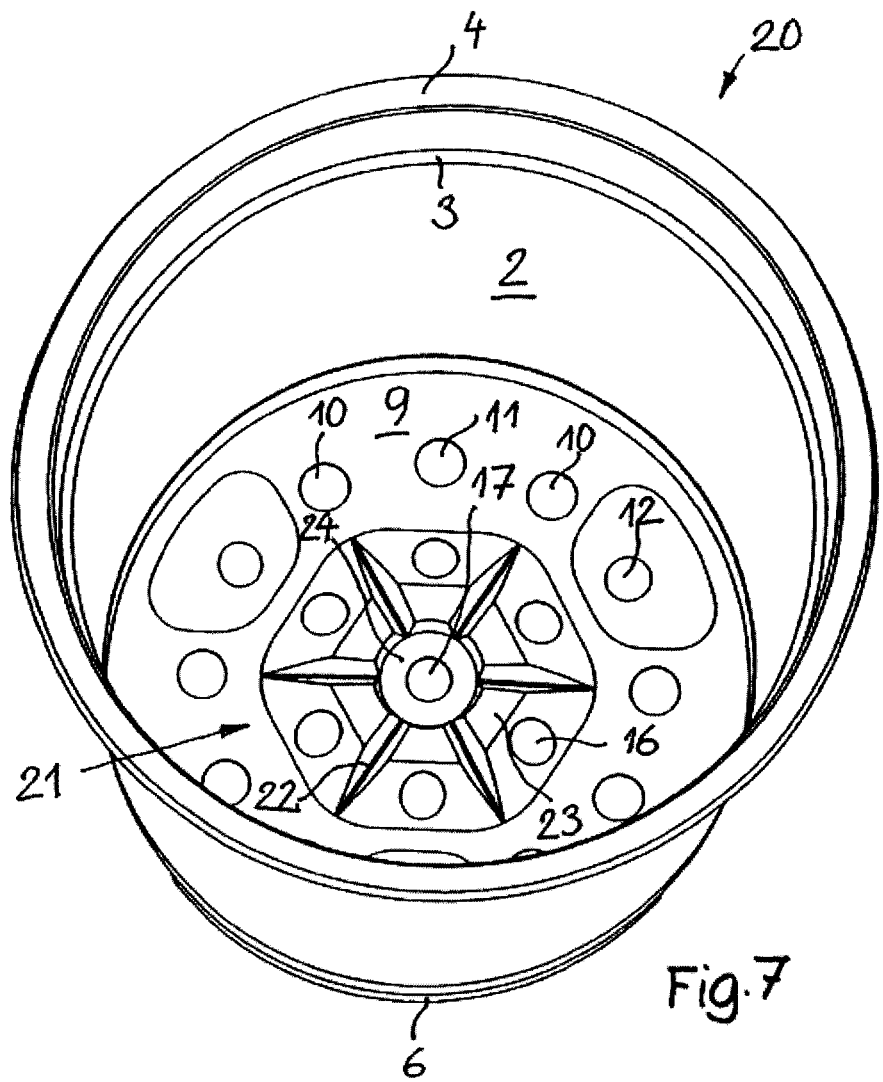
Figure 8:
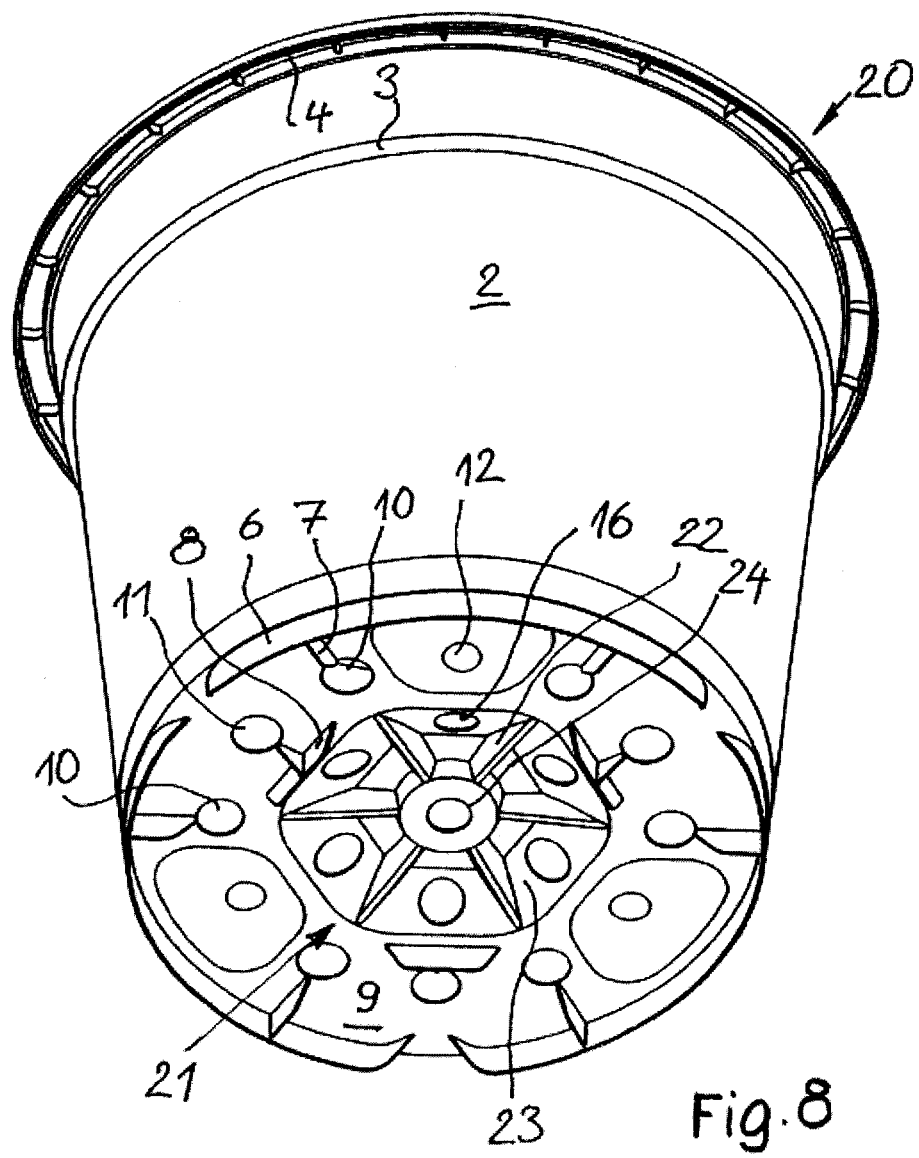
Figure 9:
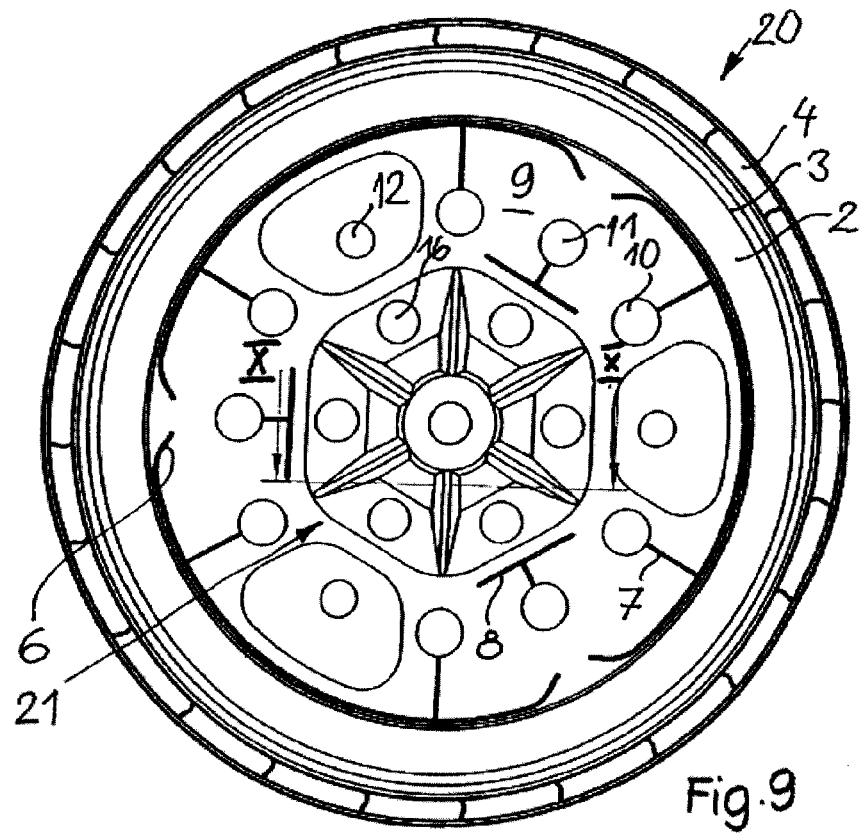
Figure 10:
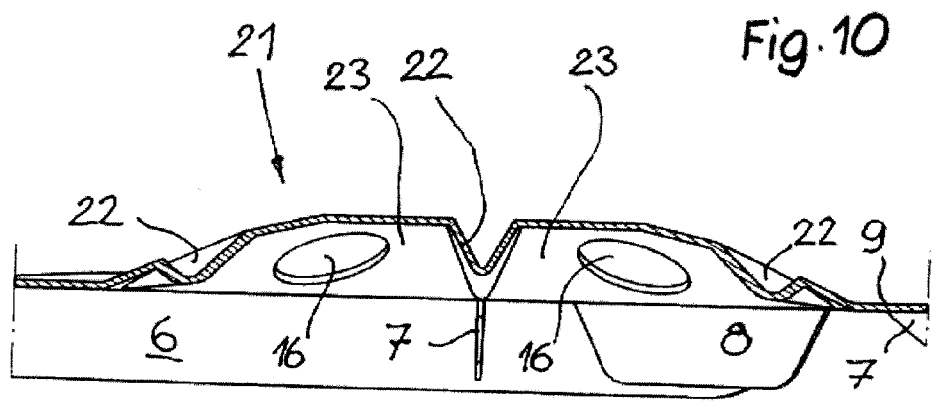
FIG. 10 Section along line X-X in FIG. 8, enlarged at a 2:1 scale

An altered embodiment form of the plant pot consists of a plant pot 20, as is illustrated in FIGS. 6 to 10. This embodiment form deviates from the previously described plant pot 1 only in the configuration of a cupola along with star-shaped profile braces 22, so that corresponding parts of the previously described plant pot are also designated with corresponding reference numbers. In plant pot 20, the cupola 21 is not reinforced by simple ribs as profile braces 14 that stand on end, but rather by hollow profiles 22 open toward the upper side. By this means, the cupola shape is also interrupted and divided into segments 23, between which the shell surfaces of cupola 21 each make a transition into the hollow profile 22 that is open on the upper side. The profile braces 22 are configured as V-shaped with a lower edge that lies roughly at the level of the peripheral area 9 or drops slightly to peripheral area 9. To this peripheral area 9 run the profile braces 22, corresponding totally to profile braces 14. On the inner side, the profile braces 22 make a transition into the peripheral wall of a depression 24 that coincides with the depression 15 of the embodiment form described initially, with each hollow profile of profile braces 22 emptying open into the depression 24 in accordance with a non-branching shell shape.

Such a configuration with hollow profiles 22 and with segment-shaped intermediate cupola areas can be produced not merely in an injection molding process, but also in a deep drawing process. True, the foot ribs are then also to be configured as hollow profiles or—burls. However, it makes it possible for them, in the same manner as the configuration of the plant pot described initially, to reinforce the cupola with the profile braces acting as interties so that in practice there can be no denting through.

Both configurations can be implemented for mass production without greater expense in producing the forms and in the procedure for providing shapes, and without any greater expense in materials, but doing away with a weakness in customary plant pots of this type and with the tendency toward malfunction going hand in hand with it.

What is claimed is:

1. A plant pot made of plastic comprising: a predominantly vertically oriented wall and a predominantly horizontally oriented bottom connected on the edge with the wall and the bottom being arched up at least in an inner portion in the form of a cupola, wherein the cupola is reinforced by braces which run horizontally from a central area of the cupola to at least peripheral areas of the cupola, said braces extending from a surface of said cupola and wherein said braces are configured as hollow profiles open to a top side of said predominantly horizontally oriented bottom and that are shaped between sectors of said cupola; said cupola being defined by an ascending portion ascending upwards into a pot body; a descending portion descending downward away from said pot body to form a depression; a substantially level portion therebetween; said ascending portion, said descending portion and said level portion each having a downward facing surface; said braces extending downward from said downward facing surface, at least some of said braces extending from said ascending portion to said descending portion.

2. Plant pot according to claim 1, wherein the cupola is configured to be point-symmetrical relative to the central area.

3. Plant pot according to claim 2, wherein the central area is configured as a depression in the cupola at the level of the braces.

4. Plant pot according to claim 2, wherein the braces are configured as hollow profiles open on the top side, that are shaped between sectors of the cupola.

5. Plant pot according to claim 2, wherein the bottom is equipped on its underside with foot projections for setup.

6. Plant pot according to claim 1, wherein the central area is configured as a depression in the cupola at the level of the braces.

7. Plant pot according to claim 6, wherein the depression is provided with at least one hole.

8. Plant pot according to claim 6, wherein the bottom between the cupola and the wall has an essentially flat peripheral area, into which the braces extend.

9. Plant pot according to claim 1, wherein the bottom between the cupola and the wall has an essentially flat peripheral area, into which the braces extend.

10. Plant pot according to claim 9, wherein the bottom is provided in the outer area with holes.

11. Plant pot according to claim 10, wherein the bottom is equipped on its underside with foot projections for setup.

12. Plant pot according to claim 11, wherein the foot projections at least on their edges, lead up to holes on the edge.

13. Plant pot according to claim 12, wherein the foot projections are added as ribs on the underside on the bottom.

14. Plant pot according to claim 1, wherein the bottom is equipped on its underside with foot projections for setup.

15. The plant pot according to claim 1 wherein said braces run continuously from said central area to said peripheral area.

16. The plant pot according to claim 1 wherein said braces run continuously from said central area to said peripheral area without interruption.

17. The plant pot according to claim 1 further comprising a plurality of ribs, said ribs being outside said cupola and each said rib being substantially in line with a said brace.

18. The plant pot according to claim 1 wherein said braces extend from an outer edge portion of said ascending portion to an inner edge portion of said descending portion.

19. The plant pot according to claim 1 further comprising a depression bottom portion, said depression bottom portion being substantially circumscribed by said descending portion.

20. The plant pot according to claim 1 further comprising said ascending portion substantially circumscribing said level portion and said level portion substantially circumscribing said descending portion.

21. The plant pot according to claim 1 further comprising said depression having a drainhole.

* * * * *